(12) United States Patent
Stroebel

(10) Patent No.: US 12,479,257 B2
(45) Date of Patent: Nov. 25, 2025

(54) DEVICE FOR AN ASSISTANCE SYSTEM FOR CONTROLLING AN ADAPTIVE LEVELING PROCESS, ASSISTANT SYSTEM, METHOD, AND COMPUTER-READABLE STORAGE MEDIUM

(71) Applicant: Bayerische Motoren Werke Aktiengesellschaft, Munich (DE)

(72) Inventor: Michael Stroebel, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/707,236

(22) PCT Filed: Oct. 7, 2022

(86) PCT No.: PCT/EP2022/077955
§ 371 (c)(1),
(2) Date: May 3, 2024

(87) PCT Pub. No.: WO2023/083534
PCT Pub. Date: May 19, 2023

(65) Prior Publication Data
US 2025/0033427 A1    Jan. 30, 2025

(30) Foreign Application Priority Data
Nov. 9, 2021   (DE) ............... 10 2021 129 090.2

(51) Int. Cl.
*B60G 17/0165*   (2006.01)

(52) U.S. Cl.
CPC ...... *B60G 17/0165* (2013.01); *B60G 2300/04* (2013.01)

(58) Field of Classification Search
CPC .. B60G 17/0165; B60G 2300/04; G06T 7/74; G06T 7/73; G06T 7/11; G06T 7/174;
(Continued)

(56) References Cited

U.S. PATENT DOCUMENTS 11,175,677 B2 * 11/2021 Ramirez Llanos ....... G06T 7/74
11,287,827 B2 *  3/2022 Berkemeier ............ G06T 7/248
(Continued)

FOREIGN PATENT DOCUMENTS

| DE | 10 2013 016 974 A1 | 3/2014 |
| DE | 10 2014 206 656 A1 | 10/2015 |

(Continued)

OTHER PUBLICATIONS

International Search Report (PCT/ISA/210) issued in PCT Application No. PCT/EP2022/077955 dated Feb. 6, 2023 with English translation (6 pages).

(Continued)

*Primary Examiner* — Toan C To
(74) *Attorney, Agent, or Firm* — Crowell & Moring LLP

(57) ABSTRACT

An apparatus associated with an assistance system of a vehicle includes a device configured to control an adaptive leveling process of the vehicle. The device receives first position data topography data and first leveling process data. The device determines second leveling process data associated with the second position data as a function of the topography data and/or the first leveling process data. The device is also configured to output an electrical control signal as a function of the second leveling process data for the leveling process of the vehicle during the second journey.

8 Claims, 3 Drawing Sheets

(58) Field of Classification Search
CPC .......... G06T 7/246; G06T 2207/10028; G06T 2207/30264; G06T 2207/30244; G06T 2207/30241; G06V 20/56; G06V 10/25; B60R 1/26; B60R 1/003; B60R 2300/301; B60R 2300/8026; B60R 2300/808; B60R 2300/304; B60W 30/18036; B60W 2050/0005; B60D 1/36; B60D 1/62; G05D 1/0251; G01C 11/28

See application file for complete search history.

(56) References Cited

U.S. PATENT DOCUMENTS

| | | | | |
|---|---|---|---|---|
| 11,400,974 | B2* | 8/2022 | Watanabe | B62D 15/0285 |
| 11,891,134 | B2* | 2/2024 | Layfield | B60D 1/30 |
| 12,005,886 | B2* | 6/2024 | Weston | B60W 40/114 |
| 12,097,899 | B2* | 9/2024 | Pandey | B60W 50/14 |
| 12,148,222 | B2* | 11/2024 | Herman | B60R 1/00 |
| 12,172,477 | B2* | 12/2024 | Salter | B60D 1/247 |
| 12,172,630 | B2* | 12/2024 | Diessner | B60D 1/46 |
| 12,233,853 | B2* | 2/2025 | Weston | B60W 50/0097 |
| 12,299,923 | B2* | 5/2025 | Ip | G06T 7/74 |
| 2014/0306425 | A1* | 10/2014 | Atkinson | B60D 1/46 280/414.5 |
| 2018/0154726 | A1* | 6/2018 | Fida | B60G 17/017 |
| 2019/0086927 | A1* | 3/2019 | Skvarce | B60D 1/36 |
| 2019/0193505 | A1 | 6/2019 | Balogh et al. | |
| 2020/0164712 | A1 | 5/2020 | Guest et al. | |
| 2023/0249673 | A1* | 8/2023 | Diessner | B60W 10/22 701/38 |

FOREIGN PATENT DOCUMENTS

| | | |
|---|---|---|
| DE | 10 2016 116 856 A1 | 3/2018 |
| DE | 11 2017 000 594 T5 | 12/2018 |
| DE | 10 2017 213 897 B4 | 8/2020 |
| DE | 10 2020 000 209 A1 | 9/2020 |
| EP | 3 047 987 A2 | 7/2016 |
| WO | WO 2014/051890 A1 | 4/2014 |
| WO | WO 2019/018885 A1 | 1/2019 |

OTHER PUBLICATIONS

German-language Written Opinion (PCT/ISA/237) issued in PCT Application No. PCT/EP2022/077955 dated Feb. 6, 2023 with English translation (12 pages).

German-language Search Report issued in German Application No. 10 2021 129 090.2 dated Jun. 17, 2022 with partial English translation (11 pages).

* cited by examiner

DEVICE FOR AN ASSISTANCE SYSTEM FOR CONTROLLING AN ADAPTIVE LEVELING PROCESS, ASSISTANT SYSTEM, METHOD, AND COMPUTER-READABLE STORAGE MEDIUM

BACKGROUND AND SUMMARY

The present disclosure relates to a device for an assistance system of a vehicle for controlling an adaptive leveling process of the vehicle. The present disclosure additionally relates to an assistance system for a vehicle. Furthermore, the present disclosure relates to a method for controlling an adaptive leveling process of the vehicle. Finally, the present disclosure relates to a computer program and a computer-readable (storage) medium.

Modern passenger vehicles, in particular off-road vehicles and so-called sport utility vehicles, currently often have a vertically-adjustable chassis for the leveling process. Vertically-adjustable chassis can be implemented here, for example, by means of a pneumatic chassis or a hydropneumatic shock absorber. The vertically-adjustable chassis can be used, for example, during driving operation to generate a zero position of the vehicle which is favorable for driving dynamics. Such a zero position of the vehicle favorable for driving dynamics is provided, for example, when corresponding cornering rocking is compensated for while cornering. In addition, vertically-adjustable chassis can also be used to ensure optimum ground clearance of the vehicle in corresponding situations so that the vehicle always remains maneuverable in corresponding terrain and does not run aground on the underbody. In addition, there are also various possibilities for advantageously using vertically-adjustable chassis in the scope of a trailer operation.

Document DE 11 2017 000 594 T5 relates to a control system for a suspension height adjustment mechanism of a vehicle. The suspension height adjustment mechanism comprises a front suspension height adjustment mechanism at a front end of the vehicle and a rear suspension height adjustment mechanism at the rear end of the vehicle. The control system is configured to control the suspension height adjustment mechanism as a reaction to user-generated control signals in order to increase the height of at least the rear end of the vehicle to a first specified vehicle height corresponding to a high trailer coupling height. In addition, the height of at least the rear end of the vehicle can be reduced to a second specified vehicle height corresponding to a low trailer coupling height. Both the first and the second specified vehicle heights are accessible from one or more other vehicle heights which differ from the first and second specified heights. The reduction of the vehicle height from the high trailer coupling height to the low trailer coupling height comprises controlling the control system of the suspension height adjustment mechanism so that the height of the front end of the vehicle is reduced less than the height of the rear end of the vehicle.

Patent specification DE 10 2017 213 897 B1 discloses a method for operating a motor vehicle which has a body and a trailer hitch at least indirectly connected to the body. The method comprises determining a trailer operation of the motor vehicle, which is coupled in an articulated manner via the trailer hitch to a trailer in the trailer operation. Furthermore, the disclosed method comprises determining at least one inclination of the motor vehicle during the trailer operation, wherein at least one movement of the trailer hitch in the vehicle longitudinal direction relative to the body and/or in the vehicle vertical direction relative to a ground arranged in the surroundings of the motor vehicle, on which the motor vehicle is supported at the bottom in the vehicle vertical direction, is effectuated depending on the determined inclination. The method disclosed in the patent specification moreover comprises determining a length of the trailer extending in the vehicle longitudinal direction and an effectuation of the at least one movement of the trailer hitch as a function of the determined length.

It is an object of the present disclosure to disclose a solution for how an assistance system for controlling an adaptive leveling process can be improved.

This and other objects are achieved according to the disclosure by a device, by an assistance system, by a method, by a computer program, and by a computer-readable (storage) medium having the features according to the independent claims. Advantageous refinements of the present disclosure are specified in the dependent claims.

A device according to the disclosure for an assistance system of a vehicle for controlling an adaptive leveling process of the vehicle during a second journey along a trajectory recorded in the scope of a first journey is configured to receive first position data which describe a position of the vehicle during the trajectory recorded in the scope of the first journey. The device is moreover configured to receive topography data and/or first leveling process data wherein the topography data describe a roadway height associated with the first position data and the first leveling process data describe a first operating state of the adaptive leveling process associated with the first position data. In addition, the device is configured to receive second position data during the second journey, wherein the second position data describe a position of the vehicle in a tolerance range of the first position data along the recorded trajectory. The device according to the disclosure is configured to determine second leveling process data associated with the second position data as a function of the topography data and/or the first leveling process data, wherein the second leveling process data describe a second operating state of the adaptive leveling process. Finally, the device according to the disclosure is configured to output an electrical control signal as a function of the second leveling process data for the leveling process of the vehicle during the second journey.

The concept of the adaptive leveling process as is used in this document designates a system using which a vehicle can be kept constant in its height, raised, or lowered.

Known intended uses are, for example, keeping the vehicle level constant in various loading states, changing the ground clearance of a vehicle, or the like.

The device according to the disclosure for the assistance system is thus used to control the adaptive leveling process of the vehicle during the journey beginning of the second journey. For this purpose, the items of information of the trajectory recorded in the scope of the first journey and topography data and/or first leveling process data can be used. Therefore, initially first position data can be received in the scope of the first journey. However, it is also conceivable that the first position data are read out from a memory. In addition, the first position data can also be provided by a so-called backend (cloud server). Independently thereof, the first position data can describe the position of the vehicle during the trajectory recorded in the scope of the first journey. The first position data can be provided, for example, by means of a global positioning system (GPS), which is provided in the vehicle in any case. It is also possible that the first position data are determined by means of odometry data. Such a method is already known, for example, from so-called reversing assistants.

In addition, the device can receive topography data for the assistance system. The topography data describe a roadway height associated with the first position data. For example, the topography data can thus be high-accuracy map data comprising items of height information or height lines. However, it is also conceivable that the topography data describe a vehicle inclination during the trajectory recorded in the scope of the first journey. In summary, the topography data can thus be used to describe a terrain along the trajectory recorded in the scope of the first journey.

Alternatively or additionally to the topography data, the device can receive first leveling process data for the assistance system. The first leveling process data can describe a first operating state of the adaptive leveling process associated with the first position data. In other words, the first leveling process data thus describe the first operating state of the adaptive leveling process during the trajectory recorded in the scope of the first journey.

For example, it is conceivable that a driver of the vehicle manually performs a control of the adaptive leveling process of the vehicle when passing a ramp in the scope of the first journey and thus changes a ground clearance of the vehicle, in order to prevent the vehicle from running aground on the ramp. If the driver of the vehicle now wishes to pass the same ramp again, the adaptive leveling process of the vehicle, which was previously manually controlled, can thus be automatically controlled. In other words, the device for the assistance system of the vehicle for controlling the adaptive leveling process of the vehicle is thus also used to automatically adapt a ground clearance of the vehicle during a journey along an already known trajectory or during the journey in a known environment according to the conditions.

For this purpose, second position data can be received during the second journey—for example from a global positioning system (GPS)—or can be determined by means of odometry data. The second position data can describe a position of the vehicle in a tolerance range of the first position data along the recorded trajectory. It can thus be provided that the trajectory during the second journey deviates from the trajectory recorded in the scope of the first journey. The trajectory of the second journey can be located within a specified driving tube around the trajectory recorded in the scope of the first journey. In summary, the second position data can thus deviate from the first position data, but the positions of the second position data can be within a tolerance range of the first position data.

In order to control the adaptive leveling process of the vehicle during the second journey, the device for the assistance system is configured to determine second leveling process data. In the ideal case, the trajectory of the second journey can be identical to the trajectory recorded in the scope of the first journey. In this ideal case, for example, the first leveling process data can be used as the second leveling process data. In case of a deviation of the trajectory of the second journey from the trajectory recorded in the scope of the first journey or in case of a deviation of the second position data from the first position data, which are nonetheless in a tolerance range of the first position data, the device for the assistance system can determine second leveling process data associated with the second position data as a function of the topography data and/or the first leveling process data. A ground clearance and thus a safe journey without the vehicle running aground can thus be ensured during a second journey along a trajectory recorded in the scope of the first journey in spite of deviations. The second leveling process data can describe a second operating state of the adaptive leveling process associated with the second position data.

Finally, the device for the assistance system outputs the electrical control signal as a function of the second leveling process data for the leveling process of the vehicle during the second journey. This electrical control signal is used to control the vertically-adjustable chassis of the vehicle, for example, in the form of a pneumatic suspension, and thus to adapt the ground clearance of the vehicle. It is also possible here that the electrical control signal or an additional electrical control signal is output to activate a brake of the vehicle and/or a brake of the trailer and/or to output a warning to a driver of the vehicle.

In a particularly advantageous embodiment, the device for the assistance system is configured to receive trailer operating data which describe a trailer operation during the first journey and/or the second journey of the vehicle, wherein a trailer is coupled to the vehicle during the trailer operation. Moreover, the device for the assistance system is also configured in the scope of the advantageous embodiment to additionally determine the second leveling process data as a function of the trailer operating data such that the trailer does not run aground during the second journey.

For the driver of a combination, which comprises a vehicle and a coupled trailer, driving on uphill slopes, downhill slopes, and in particular ramps can represent a special challenge. In particular, for example, with long single-axle trailers. When driving on an uphill slope, a downhill slope, and/or a ramp, it can occur in case of a large inclination that the trailer runs aground on an edge.

To prevent this, the device for the assistance system can receive trailer operating data. The trailer operating data can thus describe a situation in which a trailer is coupled to the vehicle. In addition, it is conceivable that the trailer operating data also describe further parameters. For example, the trailer operating data can also describe a drawbar length, a length of the trailer, wheel size of the trailer, and/or the like.

On the basis of these items of information, the device for the assistance system for controlling the adaptive leveling process of the vehicle can determine the second leveling process data such that the trailer does not run aground during the second journey. In particular, it can also be provided that no trailer is coupled to the vehicle during the trajectory recorded in the scope of the first journey, but a trailer is coupled to the vehicle during the second journey.

It is thus also possible that the device for the assistance system for controlling the adaptive leveling process of the vehicle, when determining the second leveling process data, transfers a trajectory recorded in the scope of the first journey, topography data, and/or first leveling process data to a driving situation with trailer operation during the second journey in that the trailer operating data are taken into consideration. Safely driving on downhill slopes, uphill slopes, and/or ramps can thus be made possible without the vehicle and/or the trailer running aground. In particular, a downhill slope, an uphill slope, and/or a ramp can be driven on safely and without running aground if the downhill slope, the uphill slope, and/or the ramp was passed in the scope of the first journey without trailer.

The vehicle can be designed here, for example, as a passenger vehicle. In general, however, the vehicle can also be a truck, a utility vehicle, a self-propelled work machine, a motorhome, or the like. In particular, the vehicle can also be a tractor, an agricultural or forestry tractor unit, a semi-trailer truck, a bus, or the like.

The trailer can be designed, for example, as a simple passenger vehicle trailer, which can have both an overrun brake and a separate service brake. In addition, boat trailers, motorhomes, horse trailers, semi-trailers, a harvesting machine, or the like are also conceivable.

During the second journey along the trajectory recorded in the scope of the first journey, it is possible that a regulation of the longitudinal and/or the lateral guidance of the vehicle or the combination takes place automatically. In other words, it is thus possible that maneuvering of the vehicle or the combination during the second journey takes place at least semiautomatically. The concept of the "at least semiautomated" driving or maneuvering comprises automated driving with an arbitrary degree of automation. Exemplary degrees of automation are assisted, semiautomated, highly automated, fully automated, and autonomous driving (with respectively increasing degree of automation).

An assistance system according to the disclosure for a vehicle comprises an adaptive leveling process and a device according to the disclosure for controlling the adaptive leveling process of the vehicle.

A method according to the disclosure for controlling an adaptive leveling process of the vehicle during a second journey along a trajectory recorded in the scope of a first journey comprises receiving first position data which describe a position of the vehicle during the trajectory recorded in the scope of the first journey. Moreover, the method comprises receiving topography data and/or first leveling process data, wherein the topography data describe a roadway height associated with the first position data and the first leveling process data describe a first operating state of the adaptive leveling process associated with the first position data. Moreover, the method comprises receiving second position data during the second journey, wherein the second position data describe a position of the vehicle in a tolerance range of the first position data along the recorded trajectory. The method also comprises determining second leveling process data associated with the second position data as a function of the topography data and/or the first leveling process data, wherein the second leveling process data describe a second operating state of the adaptive leveling process. Finally, the method comprises outputting an electronic control signal as a function of the second leveling process data for the leveling process of the vehicle during the second journey.

It is advantageous if trailer operating data are additionally received, by means of which at least one trailer operation is established, wherein the trailer operation at least describes whether a trailer is coupled to the vehicle. It is also advantageous in this context if the first leveling process data describe a first operating state of the adaptive leveling process associated with the first position data, wherein no trailer operation is established during the trajectory recorded in the scope of the first journey, and the second leveling process data associated with the second position data are determined as a function of the first leveling process data such that running aground of the trailer is prevented if a trailer operation is established by means of the trailer operating data during the second journey.

Furthermore, it is advantageous if travel direction data are additionally received, which describe a direction of travel of the vehicle. It is moreover advantageous here if the second leveling process data are essentially identical to the first leveling process data if the travel direction data during the second journey along the trajectory recorded in the scope of the first journey describe a travel direction opposite to the first journey.

It is thus possible that a driver of the vehicle is assisted in a particularly advantageous manner, for example, during reverse driving in the terrain, thus when driving on uphill slopes, downhill slopes, and/or ramps, during the second journey. In particular, it is also conceivable in this context that the maneuvering of the vehicle during the second journey takes place at least semiautomatically, as is already known, for example, from so-called reversing assistance systems. The driver of the vehicle can thus be relieved. Above all in known situations with trailer operation, the stress can be reduced for the driver.

A further aspect of the disclosure relates to a computer-readable (storage) medium, comprising commands which, upon execution by a computing unit, cause it to carry out a method according to the disclosure and the advantageous embodiments thereof. Furthermore, the disclosure relates to a computer program comprising commands which, upon execution of the program by a computing unit, cause it to carry out a method according to the disclosure and the advantageous embodiments thereof.

The preferred embodiments presented with reference to the method according to the disclosure and with reference to the device according to the disclosure and the advantages thereof apply accordingly to the device according to the disclosure or the method according to the disclosure, to the assistance system according to the disclosure, to the computer-readable (storage) medium according to the disclosure, and to the computer program according to the disclosure.

Further features of the disclosure result from the claims, the figures, and the description of the figures. The features and combinations of features mentioned above in the description and the features and combinations of features mentioned hereinafter in the description of the figures and/or solely shown in the figures are usable not only in the respective specified combination but also in other combinations or alone without departing from the scope of the disclosure.

The disclosure will now be explained in more detail on the basis of preferred exemplary embodiments and with reference to the appended drawings. In the figures:

DETAILED DESCRIPTION OF THE DRAWINGS

In the figures, identical or functionally-identical elements are provided with identical reference signs.

Figure 1:
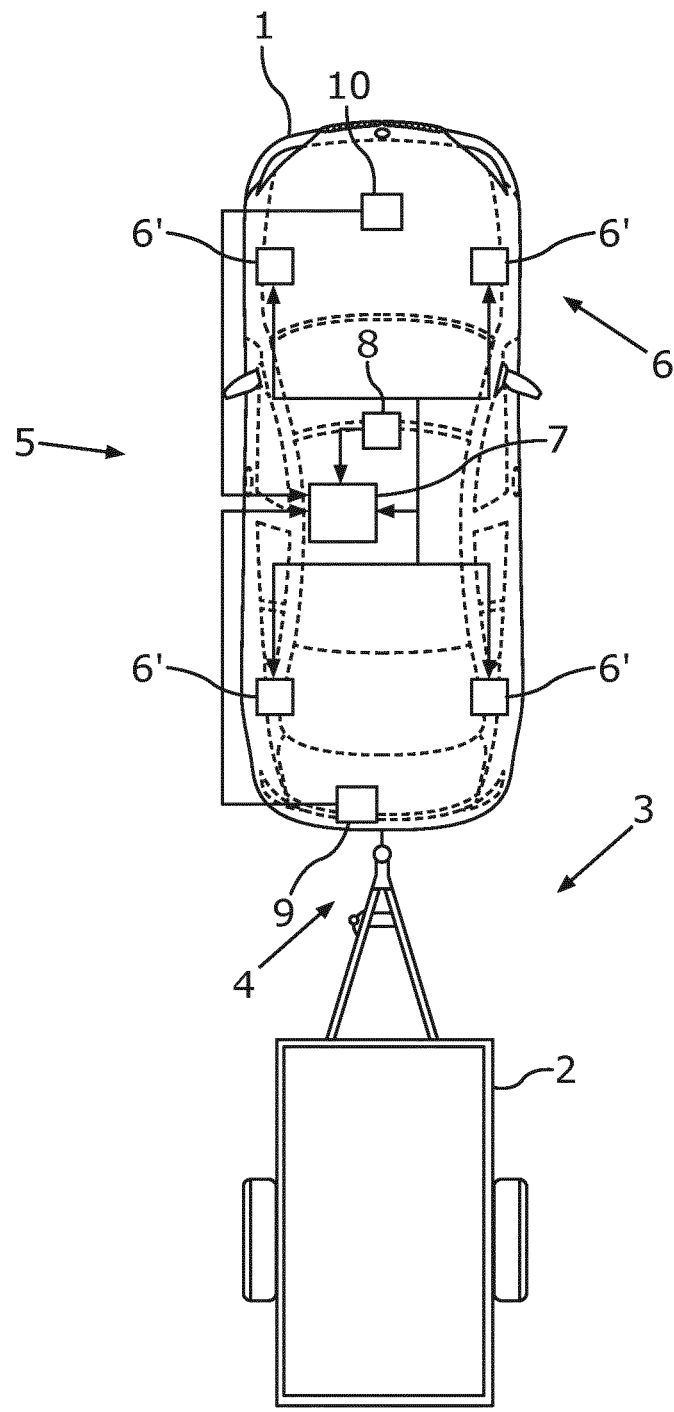
FIG. 1 shows a schematic representation of a combination comprising a vehicle and a trailer coupled to the vehicle, wherein the vehicle includes an assistance system according to the disclosure.

FIG. 1 shows a schematic representation of a combination 3, comprising a vehicle 1 and a trailer 2 coupled to the vehicle 1. The vehicle 1 can be designed here, as shown in FIG. 1, as a passenger vehicle. The trailer 2, also as shown in FIG. 1, can be designed as a simple passenger vehicle trailer. The trailer 2 is coupled by means of a trailer hitch 4 to the vehicle 1. The vehicle 1 has an assistance system 5. The assistance system 5 comprises an adaptive leveling process 6. By means of the adaptive leveling process 6, the height of the chassis 6' of the vehicle 1 can be changed, for example, by means of a pneumatic chassis or a hydropneumatic shock absorber. Moreover, the assistance system 5 comprises a device 7 for controlling the adaptive leveling process 6 of the vehicle 1.

The device 7 can receive first position data and second position data from a global positioning system (GPS) 8. In addition, the device 7 for the assistance system 2 can receive trailer operating data from a trailer unit 9. Furthermore, the device 7 can receive first leveling process data, which describe a first operating state of the adaptive leveling process 6—and thus a height of the chassis 6'-associated with the first position data. In addition, it can be provided that the device 7 receives topography data from an inclination sensor 10.

Although the first position data and the second position data are provided by means of a positioning system (GPS) 8, it is also generally conceivable that the first position data and the second position data are determined, for example, on the basis of odometry data. This method is already used, for example, in so-called reversing assistants.

The device 7 for the assistance system 5 of the vehicle 1 can be used to automatically control the adaptive leveling process 6 of the vehicle 1—and thus a height of the chassis 6'—during a second journey along a trajectory recorded in the scope of a first journey. For this purpose, first position data, which describe a position of the vehicle 1, recorded in the scope of the first journey can be received.

In addition, topography data can be received, for example, from the inclination sensor 10 and/or first leveling process data can be received from the adaptive leveling process 6 of the vehicle 1. The topography data describe a roadway height associated with the first position data. The first leveling process data can describe a first operating state of the adaptive leveling process 6 associated with the first position data.

During the second journey along the trajectory recorded in the scope of the first journey, second position data can be received from the global positioning system 8. The second position data can be located in a tolerance range of the first position data. The device 7 is configured to determine second leveling process data associated with the second position data as a function of the topography data and/or the first leveling process data. The device 7 can then output an electrical control signal as a function of the second leveling process data for the leveling process of the vehicle 1 during the second journey.

Figure 2A:
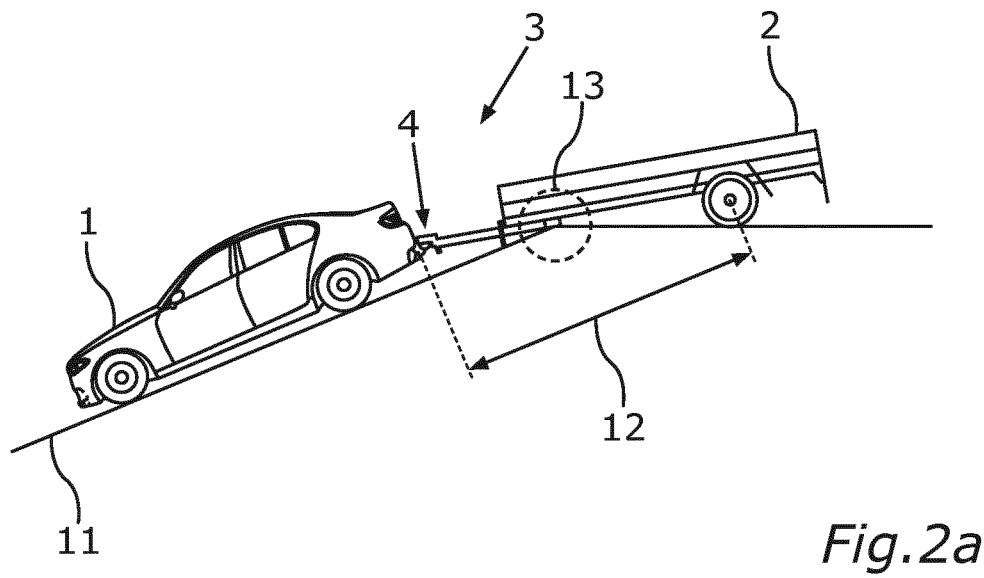
FIG. 2a shows a schematic representation of a combination when driving on a downhill slope or a ramp on which the trailer runs aground.

FIG. 2a shows a schematic representation of a combination 4 when driving on a downhill slope or a ramp 11. The combination 3 comprises a vehicle 1 and a trailer 2 coupled to the vehicle 1. The trailer 2 is coupled to the vehicle 1 by means of a trailer hitch 4. Due to the ramp 11 and the long drawbar length 12 of the trailer 2, it can occur that the trailer 2 runs aground when driving on the ramp 11. In FIG. 2a, the trailer 2 runs aground here in the area 13.

The device 7 for the assistance system 5 of the vehicle 1 for controlling the adaptive leveling process 6 of the vehicle 1 can now be used to prevent running aground in the area 13.

Figure 2B:
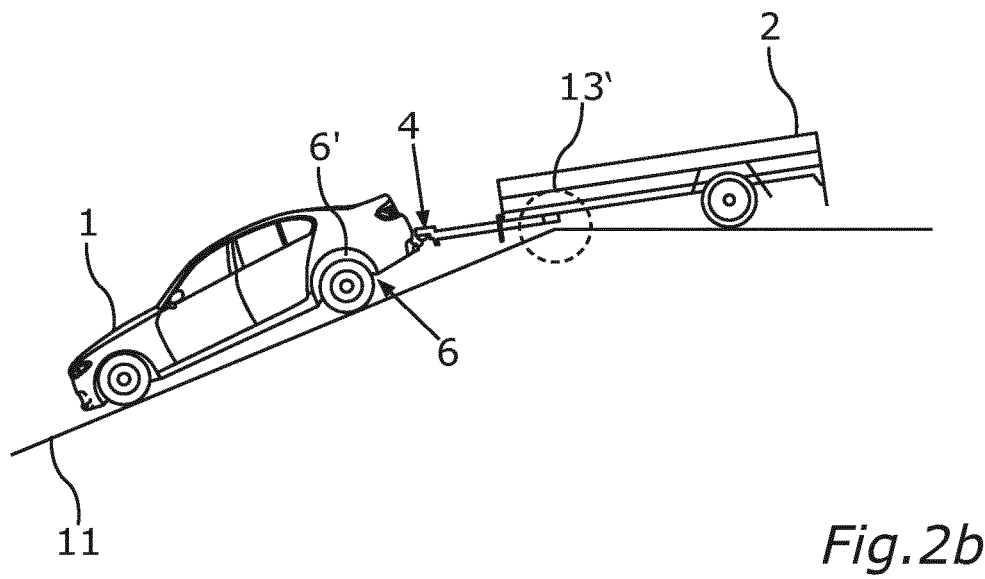
FIG. 2b shows a schematic representation of a combination when driving on a downhill slope or a ramp on which the trailer does not run aground due to an adaptive leveling process.

FIG. 2b shows a schematic representation of the combination 3 when driving on the ramp 11. Due to the adaptive leveling process 6, which can induce an increased ground clearance of the vehicle 1 or a raising of the trailer hitch 4 of the vehicle 1 by means of an adapted height setting of the chassis 6', running aground of the trailer 2 can be prevented, in contrast to FIG. 2a. This non-running aground of the trailer 2 is represented by the area 13' in FIG. 2b.

In order that the device 7 for the assistance system 5 of the vehicle 1 for controlling the adaptive leveling process 6 of the vehicle 1 can control the ground clearance or the height of the trailer hitch 4, it is necessary for a trajectory and topography data and/or first leveling process data to be recorded in the scope of a first journey. In other words, the ramp 11 is thus driven on in the scope of a first journey. This driving on the ramp 11 by the vehicle 1 can take place both with coupled trailer 2 and without coupled trailer 3. If the driving on the ramp 11 by the vehicle 1 in the scope of the first journey takes place with coupled trailer 2, a driver of the vehicle 1 can thus manually control the adaptive leveling process 6 or the height of the chassis 6' of the vehicle 1—and thus the ground clearance of the vehicle—so that running aground of the trailer 2 is prevented in the scope of the first journey.

During the first journey, in addition to the first position data, first leveling process data, which effectuate the first operating state of the adaptive leveling process 6 due to the manual leveling process of the vehicle 1 by the driver of the vehicle 1, can be recorded. During the second journey along the trajectory recorded in the scope of the first journey, thus when driving on the ramp 11, the device 7 for the assistance system 5 of the vehicle 1 can now automatically control the adaptive leveling process 6 of the vehicle 1 so that the trailer 2 does not run aground. For this purpose, for example, the recorded first leveling process data can be used directly in the scope of the second journey to control the adaptive leveling process 6 of the vehicle 1 in order to automatically prevent running aground of the trailer 2 in the area 13'. The driver of the vehicle 1 can thus be relieved during the second journey in a known environment. Driving in trailer operation thus creates less stress for the driver.

Figure 3A:
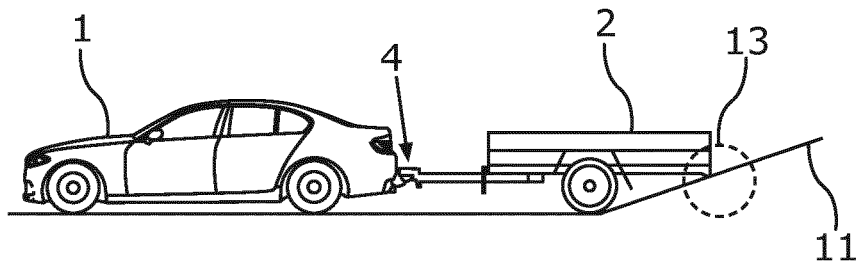
FIG. 3a shows a schematic representation of a combination when driving on a downhill slope or a ramp on which the rear of the trailer runs aground.
Figure 3B:
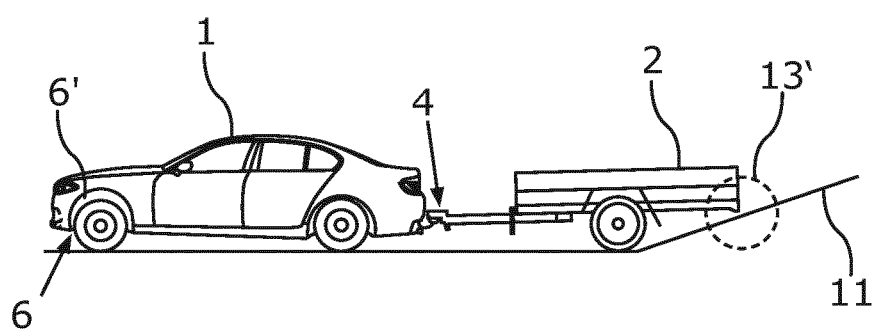
FIG. 3b shows a schematic representation of a combination when driving on a downhill slope or a ramp on which the rear of the trailer does not run aground due to an adaptive leveling process.

Similarly to FIG. 2a, FIG. 3a shows a schematic representation of a combination 4 when driving on a downhill slope or a ramp 11. The vehicle 1 is already located here on the level, whereas the trailer 2 is still on the downhill slope 11 and runs aground with the rear in the area 13 due to this. This running aground can be prevented—as shown in FIG. 3b similarly to FIG. 2b—by means of the vertically-adjustable chassis 6' in combination with the adaptive leveling process 6. This not running aground is represented by the area 13'.

As already described, the control of the adaptive leveling process 6 by means of the assistance system 6 of the vehicle 1 during the second journey can take place automatically, if a trajectory and the associated first leveling process data were already recorded during a first journey when driving on the ramp 11.

What is claimed is:

1. An apparatus associated with an assistance system of a vehicle, comprising:
 a device configured to control an adaptive leveling process of the vehicle during a second journey along a trajectory recorded in a scope of a first journey, wherein the device is configured:

to receive first position data, which describe a position of the vehicle during the trajectory recorded in the scope of the first journey, to receive a topography data and/or a first leveling process data, wherein the topography data describe a roadway height associated with the first position data and the first leveling process data describe a first operating state of the adaptive leveling process associated with the first position data, to receive second position data during the second journey, wherein the second position data describe a position of the vehicle in a tolerance range of the first position data along the recorded trajectory, to determine second leveling process data associated with the second position data as a function of the topography data and/or the first leveling process data, wherein the second leveling process data describe a second operating state of the adaptive leveling process, and to output an electrical control signal as a function of the second leveling process data for the leveling process of the vehicle during the second journey.

2. The apparatus according to claim 1, wherein the device is also configured:

to receive trailer operating data, which describe a trailer operation during the first journey and/or the second journey of the vehicle, wherein during the trailer operation, a trailer is coupled to the vehicle, and to additionally determine the second leveling process data as a function of the trailer operating data such that the trailer does not run aground during the second journey.

3. The apparatus according to claim 2, wherein the device is also configured:

to receive environmental data, which describe a ground clearance of the vehicle and/or the coupled trailer, and to correct the second leveling process data as a function of the environmental data.

4. An assistance system for a vehicle, comprising:
an adaptive leveling process,
the apparatus according to claim 1 configured to control the adaptive leveling process of the vehicle.

5. A method for controlling an adaptive leveling process of a vehicle during a second journey along a trajectory recorded in a scope of a first journey, comprising the steps of:

receiving first position data, which describe a position of the vehicle during the trajectory recorded in the scope of the first journey, receiving a topography data and/or a first leveling process data, wherein the topography data describe a roadway height associated with the first position data and the first leveling process data describe a first operating state of the adaptive leveling process associated with the first position data, receiving second position data during the second journey, wherein the second position data describe a position of the vehicle in a tolerance range of the first position data along the recorded trajectory, determining second leveling process data associated with the second position data as a function of the topography data and/or the first leveling process data, wherein the second leveling process data describe a second operating state of the adaptive leveling process, and outputting an electrical control signal as a function of the second leveling process data for the leveling process of the vehicle during the second journey.

6. The method according to claim 5, further comprising:
receiving additional trailer operating data, via which at least one trailer operation is established, wherein
the trailer operation at least describes whether a trailer is coupled to the vehicle,
the first leveling process data describe a first operating state of the adaptive leveling process associated with the first position data, wherein no trailer operation is established during the trajectory recorded in the scope of the first journey, and
the second leveling process data associated with the second position data are determined as a function of the first leveling process data such that running aground of the trailer is prevented if a trailer operation is established via the trailer operating data during the second journey.

7. The method according to claim 5, further comprising:
receiving additional travel direction data, which describe a direction of travel of the vehicle, wherein
the second leveling process data are essentially identical to the first leveling process data if the travel direction data during the second journey along the trajectory recorded in the scope of the first journey describe a direction of travel opposite to the first journey.

8. A non-transitory computer-readable storage medium, storing commands which, upon execution by a computing unit, cause the computer unit to carry out the method according to claim 5.

* * * * *